United States Patent
Tuda

Patent Number: 5,934,149
Date of Patent: *Aug. 10, 1999

[54] HAND LEVER DEVICE

[75] Inventor: Kiyosi Tuda, Akiruno, Japan

[73] Assignee: Koritz Corporation, Ohme, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/696,072

[22] Filed: Aug. 13, 1996

[30] Foreign Application Priority Data

Aug. 14, 1995 [JP] Japan ......................... 7-27014

[51] Int. Cl.⁶ ........................................... F16C 1/10
[52] U.S. Cl. ................. 74/502.2; 74/500.5; 74/501.5 R; 74/502.4; 30/382
[58] Field of Search ................ 74/500.5–502.6, 74/489, 526; 30/382

[56] References Cited

U.S. PATENT DOCUMENTS

| | | | |
|---|---|---|---|
| 3,361,165 | 1/1968 | Irgens | 74/500.5 X |
| 3,856,123 | 12/1974 | Kinsey | 74/506 X |
| 3,896,680 | 7/1975 | Shoemaker | 74/489 |
| 4,019,402 | 4/1977 | Leonheart | 74/489 |
| 4,028,804 | 6/1977 | Hammon | 30/382 |
| 4,302,880 | 12/1981 | Elfving et al. | 30/362 |
| 4,406,066 | 9/1983 | Itzrodt | 30/382 |
| 4,667,459 | 5/1987 | Scanland et al. | 74/475 |
| 4,898,039 | 2/1990 | Aiyama et al. | |
| 5,046,380 | 9/1991 | Matsumoto et al. | 74/502.4 |
| 5,182,962 | 2/1993 | Leiter | 74/473 R |

FOREIGN PATENT DOCUMENTS

| | | | |
|---|---|---|---|
| 2723869 | 12/1977 | Germany | 74/502.4 |
| 51-23788 | 6/1976 | Japan . | |
| 57-19944 | 4/1982 | Japan . | |
| 63-269735 | 11/1988 | Japan | 74/502.6 |
| 3-35856 | 7/1991 | Japan . | |
| 3-199770 | 8/1991 | Japan | 74/502.6 |
| 5-126130 | 5/1993 | Japan | 74/502.6 |
| 2236570 | 4/1991 | United Kingdom | 74/502.6 |
| WO 94/00703 | 1/1994 | WIPO | 74/502.6 |

*Primary Examiner*—Vinh T. Luong
*Attorney, Agent, or Firm*—Intellectual Property Group of Pillsbury; Madison & Sutro LLP

[57] ABSTRACT

A hand lever device includes a housing (15A, 15B) and a main lever (30) pivotally attached to the housing (15A, 15B). The main lever (30) is connected to one end (22a) of an inner cable (22) extending through an outer tube (21) of a Bowden cable (20) for controlling a driven member (CV). The outer tube (21) is provided with a shifting mechanism (40), such as a threaded member shifting mechanism (41, 45), for forcibly shifting one end (21a) of the outer tube (21) along the longitudinal direction of the inner cable (22).

9 Claims, 5 Drawing Sheets

HAND LEVER DEVICE

BACKGROUND OF THE INVENTION

1. Field of the Invention

The present invention relates to a hand lever device for operating a driven member, such as a throttle valve, of an internal combustion engine via a cable. In particular, the hand lever is preferably mounted on a working machine, such as a hedge trimmer or brush cutter, in the vicinity of a hand grip so that it is easy and convenient to operate such a throttle valve or the like via a throttle cable or the like.

2. Description of the Prior Art

For example, a working machine, such as a hedge trimmer and brush cutter, comprises an operative portion including a cutting blade or the like driven by an internal combustion engine. A hand lever device is provided in the working machine for controlling the degree of opening of a throttle valve of the internal combustion engine. Such a hand lever is mounted in the vicinity of a grip of a U-shaped handle, a bar handle or the like of the working machine so as to provide manual control of the output force of the internal combustion engine.

The hand lever device is generally provided with a throttle trigger (throttle lever) operated by operator's fingers with the throttle lever being pivotally operated to thereby control the degree of opening of the throttle valve via a throttle cable. In general, the throttle valve is always biased toward the direction of minimum valve opening that allows the engine to idle. Accordingly, the throttle valve is normally kept at the idle opening position and, when the throttle cable is drawn in a predetermined amount to eliminate play, it begins to open from the opening position for idling (slow running) of the engine toward an opening position for operation (higher running speed) of the engine.

Such known hand lever devices for controlling throttle valve settings include an automatic return to an idle setting type and an immobilizable type. In the former type, when such a throttle lever is released from a pivotally operated position, the lever is automatically returned to its original idle position setting, thereby moving the throttle valve to its idle setting. In the latter type, when fingers are released from a throttle lever, the throttle lever is held immobilized at a desired pivotally operated position (see Japanese Examined Utility Model Publication No. 19944/1982, etc.).

In the auto-return type, when fingers are released from the throttle lever, the engine is automatically returned to the idling condition. Consequently, when the auto-return type is used in a working machine, where the output force of the engine is transmitted to an operative portion including a cutting blade via a centrifugal clutch, the centrifugal clutch is disconnected to cut off the transmission of the driving force to the operative portion. Accordingly, the operation of the machinery can immediately be stopped by returning the throttle valve to the opening degree for idle running if an accident occurs, thereby advantageously attaining improved safety. On the other hand, the throttle valve must be held continuously by fingers at a desired pivotal operation position to achieve the desired operation of the machinery. This causes problems in that this type is awkward with respect to intermediate opening degrees, the fingers are susceptible to fatigue, and the speed of the engine is likely to be unstable.

In general, for operational convenience, it is desired that a lever which is manually operated to pivot, for example, a throttle lever which is alternatively shifted between a released position and a set position (gripped position), without being suspended at any intermediate position. Accordingly, it is preferred in terms of operability that the lever be set in the same pivotal operation position (set position) regardless of whether an intermediately open condition (partially open condition) or the fully open condition (W.O.T.) of a throttle valve is intended.

On the other hand, the immobilizable type is capable of solving the above problems associated with the auto-return type. The immobilizable type advantageously holds the throttle lever at a desired pivotal operation position without the throttle lever being held by the operator's fingers. This enables easy cutting operation because the operator's fingers are liberated from holding it. However, since additional operation is required to release the throttle lever from the immobilized position, it is impossible to immediately stop the machinery even if an accident occurs. Accordingly, there is a problem that, in terms of safety, the immobilizable type is inferior to the auto-return type.

SUMMARY OF THE INVENTION

The present invention has been made in view of these problems. It is, therefore, an object of the present invention to provide a hand lever device which is free of the above-mentioned drawbacks inherent in the auto-return type and the immobilizable type and which combines the advantages of these types. Specifically, the hand lever device permits a throttle valve to be appropriately adjusted with respect to its degree of opening, via a cable, and kept at a desired opening degree and yet immediately returned to the opening degree associated with an idle condition. This ensures high safety, diminishes fatigue of fingers and provides preferred operability.

To attain the above-mentioned objective, the present invention comprises a driven member and a hand lever device. The hand lever device includes:

- a housing; and
- a main lever pivotally attached to said housing, the main lever connected to one end of an inner cable extending through an outer tube of a Bowden cable for controlling a driven member, and the outer tube being provided with a shifting means for forcibly shifting one end of the outer tube along the longitudinal direction of the inner cable.

In one preferred embodiment of the present invention, the shifting means is a threaded member shifting mechanism comprising a tubular external thread member connected to the end of the outer tube and an adjusting dial screwed on the external thread member. In another preferred embodiment, the shifting means is a lever mechanism comprising an adjusting lever, a pivot link fixedly connected to the adjusting lever, and a tractive connecting member connectively disposed between the pivot link and the end of the outer tube.

A throttle valve of an internal combustion engine forms a typical preferred example of the driven member. In this case, the throttle valve is always biased in the direction of a degree of opening that allows the engine to idle and, when a throttle cable connected thereto is drawn from a non-operating position by a predetermined amount or more to eliminate play, the throttle valve begins to open from the opening position for the idle condition. According to the present invention, the hand lever device is disposed in the vicinity of a handle grip of a working machine. The operative portion of the working machine includes a cutting blade which is driven by the internal combustion engine provided with the throttle valve. One end of the throttle cable extends through the outer tube of the Bowden cable and is connected to the pivotally operated main lever. The outer tube is provided with a shifting means for forcibly shifting one end of the outer tube along the longitudinal direction of the inner cable.

According to the present invention, when the main lever is in the released position, the throttle valve is in the minimum opening position that allows the engine to idle. When the main lever is pivotally operated from this position to the set position close to the grip, the throttle cable formed by an inner cable of the Bowden cable is drawn by the main lever to eliminate play.

The adjusting dial is screwed on the external thread member attached to one end of the outer tube via the terminal metal piece. When the adjusting dial is turned in the right direction as part of the shifting mechanism, the end of the outer tube is shifted together with the external thread member in the same direction as that in which the throttle cable is drawn. The strain of the outer tube, which is normally led with an appropriate slack, is thereby somewhat shifted. Consequently, one end (connected to the main lever) of the throttle cable (inner cable) extending through the outer tube remains still whereas the other end (connected to the throttle valve) is drawn and shifted in such a direction that degree of opening of the throttle valve is increased. (With respect to the shift of an inner cable resulting from the shift of strain of an outer tube, see Japanese Examined Patent Publication No. 35856/1991.)

Therefore, by preliminarily turning the adjusting dial so as to adjust the end of the outer tube to an appropriate position, and then pivotally operating the main lever by fingers to the set position close to the grip to eliminate play of the throttle cable, the throttle valve is brought to a position with an opening degree determined according to the shifted position of the end of the outer tube. In other words, the degree of opening of the throttle valve is adjusted by the adjusting dial.

Further, in the event that it is necessary to immediately lower the speed of the engine due to occurrence of accident or the like, the main lever is completely released. The main lever is thereby pulled by the throttle cable to return to its original position because the throttle cable is always biased toward the direction of the minimum opening position of the throttle valve. The throttle cable is returned to a non-operating condition, and the throttle valve is returned to its original position which allows the engine to idle. Consequently, the engine is automatically brought into its idle condition. If the working machine is adapted so that the rotational driving force of the engine is transmitted to the operative portion including the cutting blade and the like via a centrifugal clutch, the centrifugal clutch is disconnected to cut off the transmission of the driving force to the operative portion. Thus, the operation of the operative portion including the cutting blade and the like is immediately stopped.

DESCRIPTION OF THE PREFERRED EMBODIMENTS

The present invention will be described in more detail with reference to the accompanying drawings.

Figure 1:
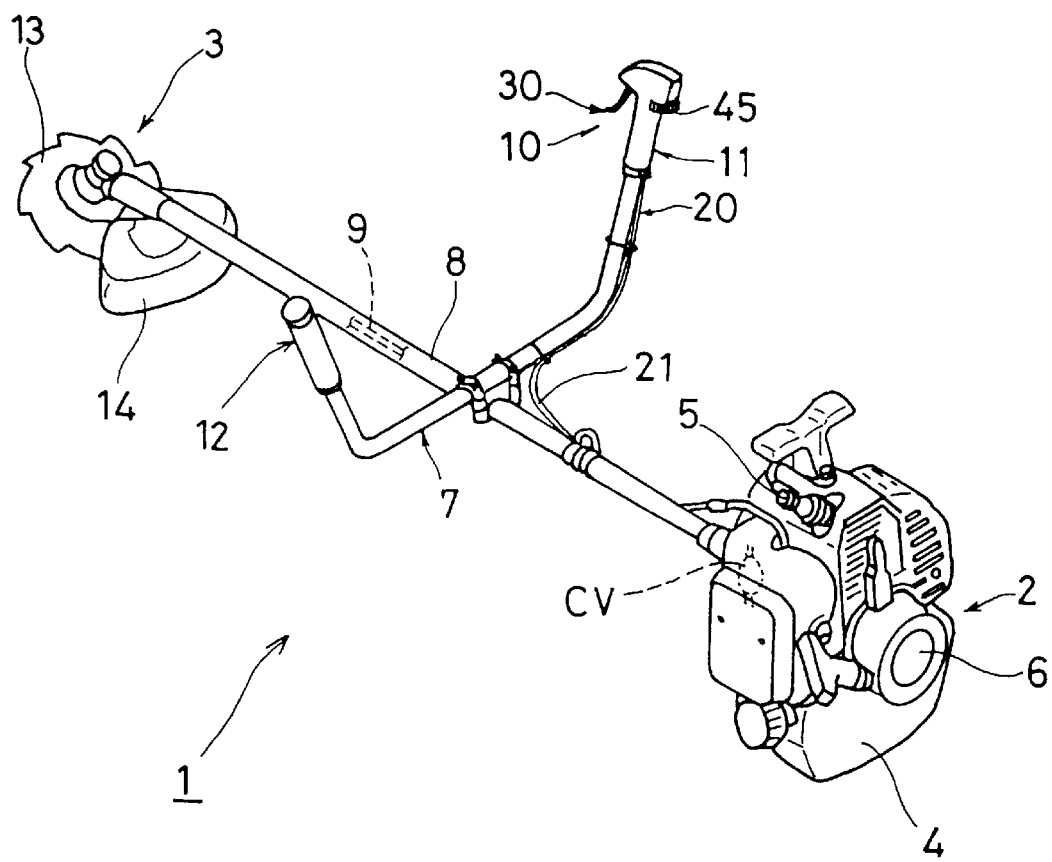
FIG. 1 is a perspective view showing an example of a brush cutter adopting one embodiment of the hand lever device according to the present invention.

FIG. 1 shows an example of a brush cutter employing one embodiment of the hand lever device according to the present invention. The illustrated brush cutter 1 comprises a U-shaped handle 7 provided with right and left grips 11, 12 spaced a predetermined distance apart, an operating rod 8 supporting the U-shaped handle 7, and an operative portion 3 provided on the distal end of the operating rod 8. The operative portion 3 includes a cutting blade 13, a safety cover 14, etc. The brush cutter 1 further comprises an internal combustion engine 2, for example, a small air-cooled two-cycle gasoline engine, which is disposed on the proximal end of the operating rod 8. The engine 2 provides driving power for driving the cutting blade 13 via a drive shaft 9 extending through and within the operating rod 8. The internal combustion engine 2 is provided with a carburetor (not shown) having a throttle valve CV and a spark plug 5. The internal combustion engine 2 also includes a fuel tank 4 and a recoil starter 6.

In this example, the throttle valve CV is always biased in the direction of a minimum degree of opening (for an idle condition). When a throttle cable (inner cable) 22 connected thereto, which will be described below, is drawn from non-operating position in a predetermined amount to eliminate play, the throttle valve CV begins to open from the minimum idle opening position.

One embodiment of the hand lever device 10, according to the present invention, is provided in the grip 11, which is one of the grips 11 and 12 that is gripped generally by an operator's right hand. The hand lever device 10 is used to adjust the degree of opening of the throttle valve CV.

Figure 2:
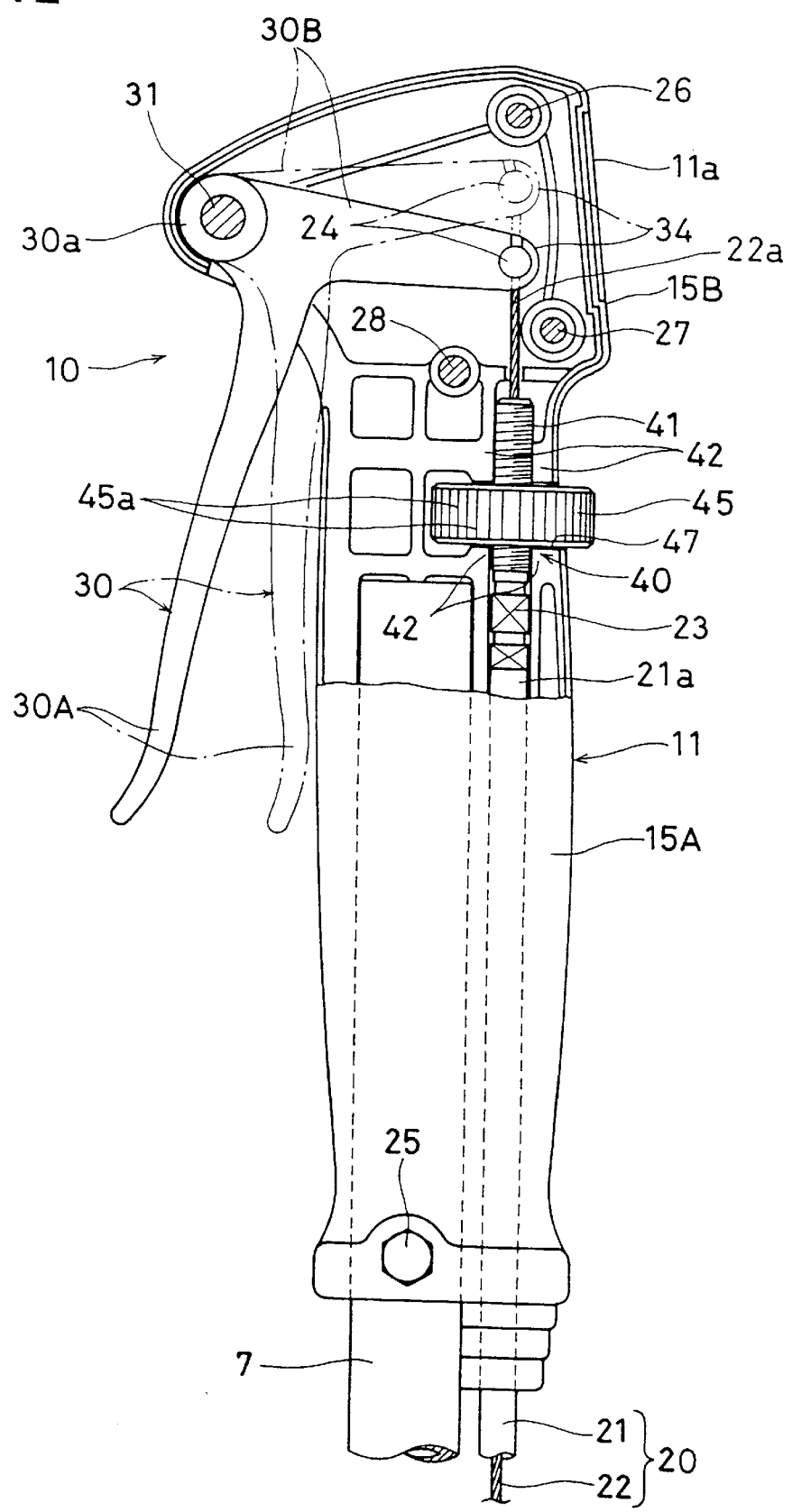
FIG. 2 is a partially cutaway left side view showing one embodiment of the hand lever device according to the present invention.

As shown in FIG. 2, the hand lever device 10 is located at an expanded portion 11a provided at the head portion of the grip 11 composed of cover members 15A and 15B (hereinafter often referred to simply as cover 15A, 15B) which are clamped together by means of clamping members 25, 26, 27, 28 and 31 such as bolts. The hand lever device 10 comprises a substantially dog-legged main lever 30 having a finger-operated portion 30A and a drawing portion 30B and is pivotally supported at its base end 30a by the bolt shaft 31 which is used also as one of the above-mentioned clamping members. By the main lever 30, the throttle cable 22 is drawn. The throttle cable 22 is formed by an inner cable extending through and within an outer tube 21 of a Bowden cable 20.

Specifically, the drawing portion 30B of the main lever 30 has its tip portion formed into a holder 34 for holding a terminal metal piece 24 fixedly attached to one end 22a of the throttle cable (inner cable) 22. By pivotally operating the finger-operated portion 30A, the throttle cable 22 is drawn by the drawing portion 30B in a predetermined amount to eliminate play.

To the one end 21a of the outer tube 21 of the Bowden cable 20 which is the distal end located in the grip 11, a terminal metal piece 23 is fixedly attached which is cut in a parallel fashion to prevent free-running. To the terminal metal piece 23, an external tubular thread member 41 having a predetermined length is in turn distally fixed. An adjusting dial 45 formed with knurls 45a is screwed on the external thread member 41 so that the adjusting dial 45 is partially protruded from an opening 47 formed in the sidewall of the grip 11 at a position opposite to the main lever 30 and slightly below the expanded portion 11a. The adjusting dial 45 is rotatably held by holder elements 42, formed in the grip 11 (cover 15A, 15B) and at the same time inhibited by the holder elements 42 from moving in the longitudinal direction of the external thread member 41 (vertical direction).

Thus, the external thread member 41 attached to the end 21a of the outer tube 21 via the terminal metal piece 23 and the adjusting dial 45 screwed on the external thread member 41 constitute an external thread member shifting mechanism 40. By turning the adjusting dial 45, the external thread member 41 and concurrently the end 21a of the outer tube 21 are shifted. After completion of the adjustment, the end 21a of the outer tube 21 still remains at the adjusted position without the adjusting dial 45 being held by operator's finger.

In the hand lever device 10 of this embodiment which is constructed as described above, when the main lever 30 is in the released condition as shown by a solid line in FIG. 2, the throttle valve CV is in the minimum opening condition that allows the engine 2 to idle. When the main lever 30 is pivotally operated from this condition to the set position close to the grip 11 as shown in phantom in FIG. 2, the throttle cable 22 is drawn by the main lever 30 in a predetermined amount to eliminate play.

The adjusting dial 45 is screwed on the external thread member 41 attached to the end 21a of the outer tube 21 via terminal metal piece 23. When the adjusting dial 45 is turned in the right direction the end 21a of the outer tube 21 is shifted together with the external thread member 41 in the same direction as that in which the throttle cable 22 is drawn (the upward direction in FIG. 2). The outer tube 21 of the Bowden cable 20, which is led normally with an appropriate slack as shown in FIG. 1, is thereby somewhat shifted by the strain. Consequently, one end 22a (connected to the main lever 30) of the throttle cable 22 extending through the outer tube 21 remains still whereas the other end (connected to the throttle valve CV) is drawn and shifted in such a direction that degree of opening of the throttle valve CV) is increased. When the adjusting dial 45 is oppositively turned in the left direction, the end 21a of the outer tube 21 is downwardly shifted together with the external thread member 41. In consequence, the throttle cable 22 is shifted in such a direction that degree of opening of the throttle valve CV is decreased.

Therefore, by preliminarily turning the adjusting dial 45 so as to adjust the end 21a of the outer tube 21 to an appropriate position, and then pivotally operating the main lever 30 by fingers to the set position close to the grip 11 to eliminate play of the throttle cable 22, the throttle valve CV is brought to a position with an opening degree determined according to the shifted position of the end 21a of the outer tube 21. In other words, the degree of opening of the throttle valve CV is adjusted by the adjusting dial 45.

Further, in the event that it is necessary to immediately lower the speed of the engine 2 due to occurrence of an accident or the like, the main lever 30 is completely released. The main lever 30 is thereby pulled by the throttle cable 22 to return to its original position because the throttle cable 22 is always biased toward the direction of the minimum opening position of the throttle valve CV. The throttle cable 22 is returned to non-operating condition, and the throttle valve CV is returned to its original position which allows the engine 2 to idle. Consequently, the engine 2 is automatically brought into its idle condition. If the working machine 1 is adapted so that the rotational driving force of the engine 2 is transmitted to the operative portion 3 including the cutting blade 13 and the like via a centrifugal clutch, the centrifugal clutch is disconnected to cut off the transmission of the driving force to the operative portion 3. Thus, the operation of the operative portion 3 including the cutting blade 13 and the like is immediately stopped.

Figure 3:
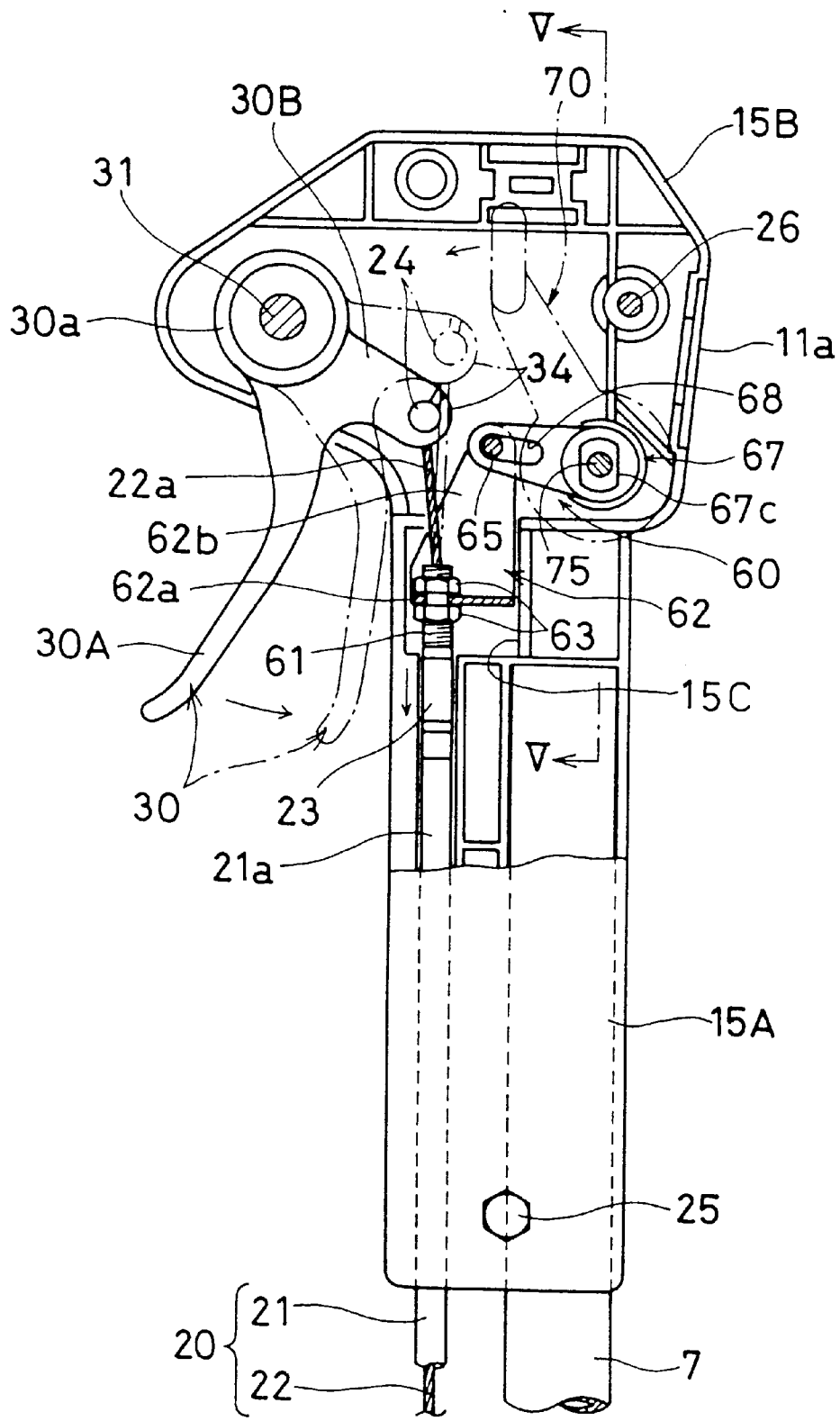
FIG. 3 is a partially cutaway left side view showing another embodiment of the hand lever device according to the present invention.
Figure 4:
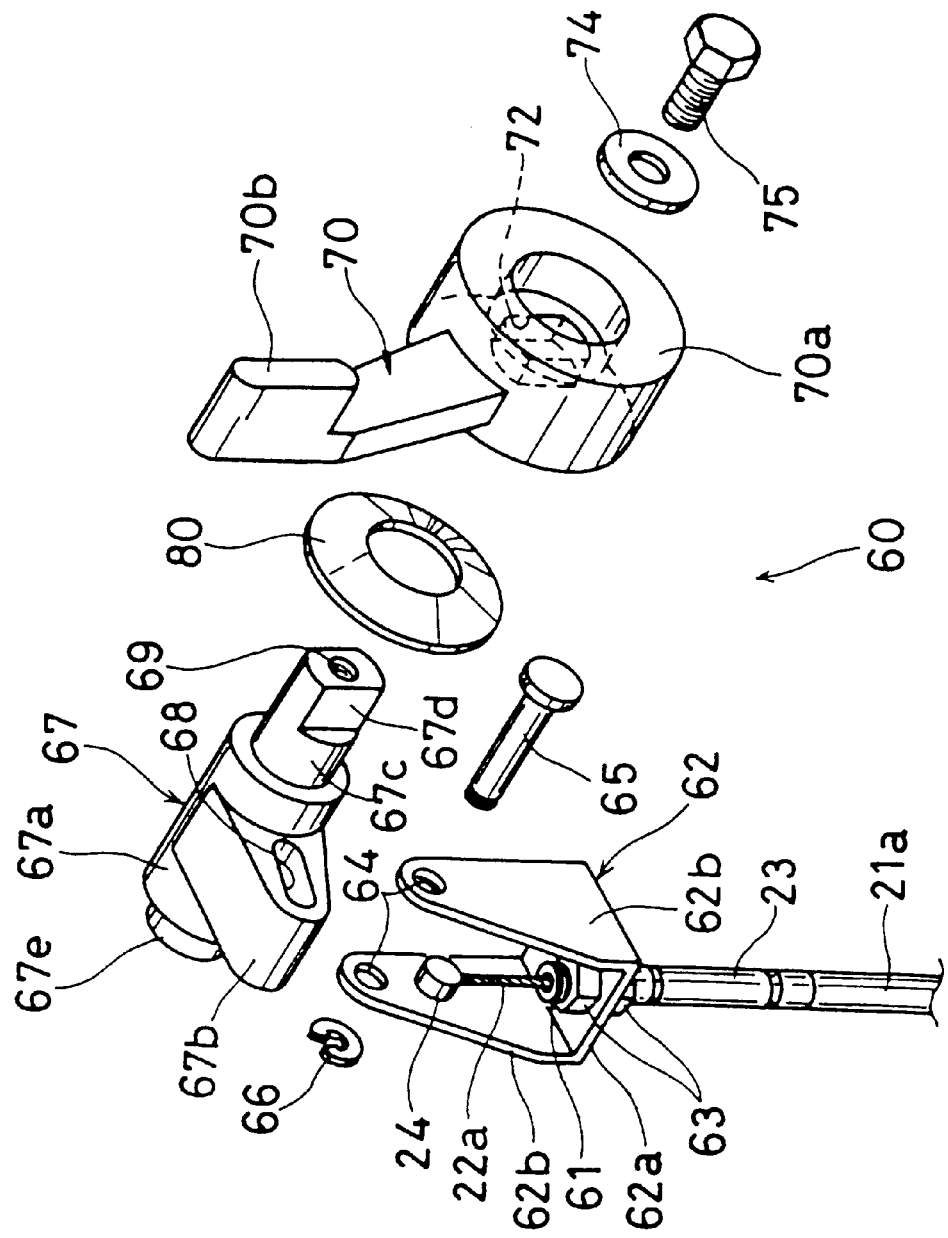
FIG. 4 is an exploded view of a characteristic portion of the embodiment in FIG. 3.
Figure 5:
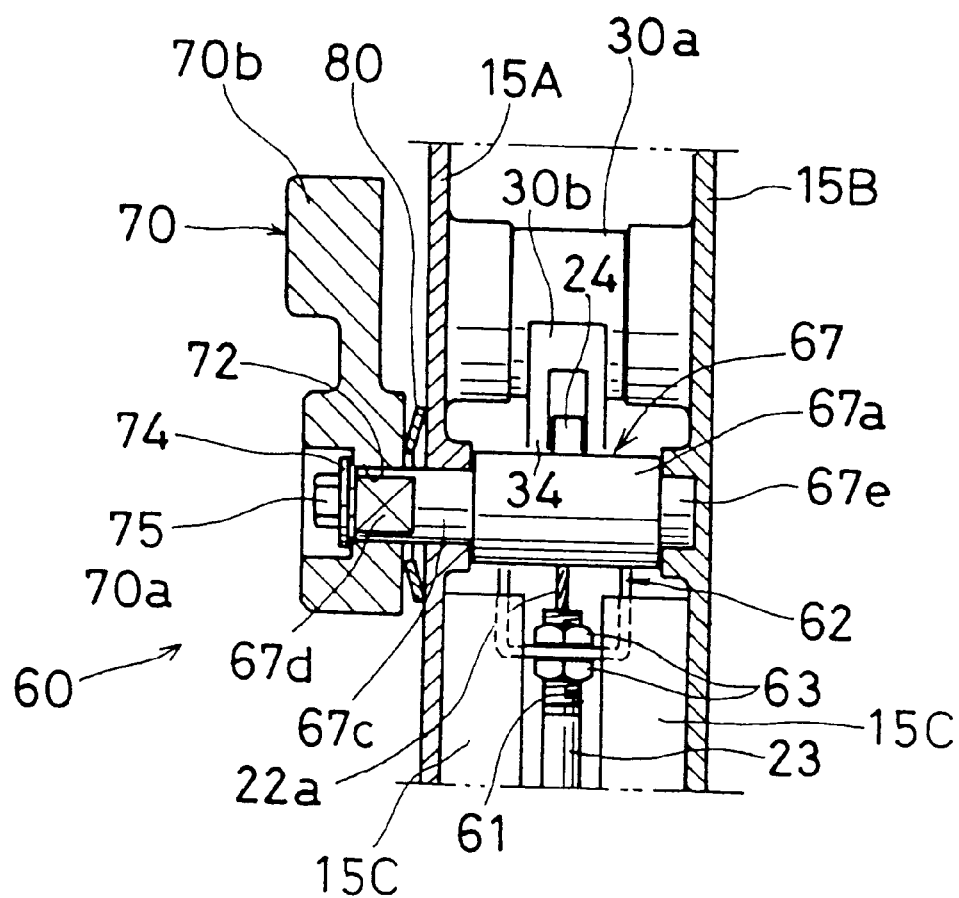
FIG. 5 is a sectional view taken along the line V—V and viewed in the direction of arrows V in FIG. 3.

FIG. 3 shows another embodiment of the hand lever device according to the present invention. In this embodiment, one end 22a of a throttle cable (inner cable) 22 is connected to a main lever 30 in the same manner as in the previously described embodiment. Thus, a detailed explanation thereof is omitted. However, this embodiment is different from the previous embodiment in that a lever mechanism 60 is used as a shifting member for forcibly shifting one end 21a of an outer tube 21. As shown in detail in FIGS. 4 and 5, the lever mechanism 60 comprises an adjusting lever 70 externally and pivotally mounted on a case 15A, 15B, a pivot link 67 fixedly connected to the adjusting lever 70 and located substantially within the case 15A, 15B, and a tractive connecting member 62 interposed between the pivot link 67 and the end 21a of the outer tube 21.

More in detail, the adjusting lever 70 is provided with an operating knob 70b at its tip and has a cylindrical base 70a with a side wall formed with an elliptical fit-in hole 72. The pivot link 67 includes: a body shaft 67a having a larger diameter, an arm 67b radially protruding from the body shaft 67a, supporting pin portions 67c, 67e respectively protruding from left and right ends of the body shaft 67a and each having a smaller diameter, and a fit-in portion 67d extending from the left supporting pin 67c and having its sides cut parallelly to conform with the fit-in hole 72. An internal thread 69 is formed in the fit-in portion 67d and the left supporting pin portion 67c along their common axis.

The fit-in portion 67d is fitted in the fit-in hole 72 of the adjusting lever 70. The fit-in portion 67d is provided at the left end of the pivot link 67 and disposed with its fit-in portion 67d protruding from the case member 15A. The pivot link 67 and the adjusting lever 70 are fixed together by means of a screw 75 screwed in the internal thread 69 with a washer 74 interposed therebetween so as to rotate together. The pivot link 67 is rotatably supported by the case 15A, 15B at its supporting pin portions 67c, 67e.

Between the adjusting lever 70 and the left case member 15A, a belleville spring 80 is interposed. By adjusting screw-in amount of the screw 75 under the elastic action of the belleville spring 80, frictional force between the case 15A (the left end surface of the body shaft 67a of) the pivot link 67 and the adjusting lever 70. The adjusting lever 70 is thereby held immobilized at a desired pivotally operated position without being held by operator's fingers.

On the other hand, the tractive connecting member 62 is connectively disposed between the pivot link 67 and the end 21a of the outer tube 21. The tractive connecting member 62 includes a horizontal bottom plate 62a with a hole and side plates 62b, 62b which vertically extend from both ends of the bottom plate 62a, and thus has a staple-shaped cross-section. A tubular external thread member 61 fixedly connected to the end 21a of the outer tube 21 via a terminal metal piece 23 is inserted through the bottom plate 62a, and a pair of lock nuts 63, 63 are screwed on the external thread member 61 with the bottom plate 62a held therebetween to fixedly connect the outer tube 21 and the tractive connecting member 62. The side plates 62b, 62b are guided along guide walls 15C, 15C of the case 15A, 15B and thus vertically slidable.

The pivot link 67 and the tractive connecting member 62 are pivotally connected to each other with a pin 65 and a C-shaped ring 66 which prevents the pin 65 from coming off. The pin 65 is inserted through an oblong hole 68 formed in the arm 67b of the pivot link 67 and insertion holes 64 formed in upper portions of the side plates 62b, 62b of the tractive connecting member 62.

When the adjusting lever 70 is pivotally operated in the clockwise direction, the end 21a of the outer tube 21 is shifted together with the external thread member 61 via the pivot link 67 and the tractive connecting member 62. In this condition, even if the operator's fingers are removed from the adjusting lever 70, the adjusting lever 70, the pivot link 67, the tractive connecting member 62 and the end 21a of the outer tube 21 remain still and are kept at the respective adjusted positions by the frictional force between the case 15A (the left end surface of the body shaft 67a of), the pivot link 67 and the adjusting lever 70.

Therefore, by preliminarily pivotally operating the adjusting lever 70 so as to adjust the end 21a of the outer tube 21 to an appropriate position, and then pivotally operating the main lever 30 by fingers to the set position close to the grip 11 to eliminate play of the throttle cable 22, the throttle valve CV is brought to a position with an opening degree determined according to the shifted position of the end 21a of the outer tube 21. Thus, the degree of opening of the throttle valve CV is adjusted as in the previous embodiment.

Further, in the event that it is necessary to immediately lower the speed of the engine 2 due to occurrence of an accident or the like, the main lever 30 is completely released. The throttle cable 22 is returned to non-operating condition, and the throttle valve CV is automatically returned to its original position which allows the engine 2 to idle. Thus, substantially the same effect is attained as in the previous embodiment.

The present invention has been described in detail with reference to the two embodiments. It is, however, to be understood that the present invention is by no means restricted to the illustrated embodiments and that various modifications may be made within the scope which does not depart from the spirit of the present invention as defined in the claims.

For example, as the shifting member for shifting the end 21a of the outer tube 21, a sliding knob mechanism may be used which comprises a sliding knob linearly slidable to draw the end 21a of the outer tube 21 and a frictionally holding means for holding the sliding knob at a desired position, instead of the threaded member shifting mechanism 40 or lever mechanism 60.

Further, in the illustrated embodiments, the hand lever device 10 according to the present invention is used to control opening degree of the throttle valve CV of the internal combustion engine 2. It is, however, to be noted that the hand lever device according to the present invention may, of course, be used in applications other than adjusting the opening degree of the throttle valve CV.

Moreover, the hand lever device 10 as such may be used by mounting it on a bar handle and the like besides the U-shaped handle 7.

As understood from the above description, according to the hand lever device of the present invention, the hand lever device permits a throttle valve to be appropriately adjusted as to its degree of opening, via a cable, and kept at a desired opening degree and yet immediately returned to the opening degree associated with an idle condition. This ensures high safety and diminishes fatigue of the operator's fingers and provides preferred operability.

What is claimed is:

1. An apparatus comprising:
   a driven member; and
   a hand lever device comprising:
      a housing;
      a main lever pivotally attached to said housing; and
      a Bowden cable having an inner cable and an outer tube;
   wherein one end of said inner cable is connected to said main lever and extends through said outer tube for controlling said driven member;

said outer tube is provided with a shifting means for forcibly shifting one end of said outer tube along the longitudinal direction of said inner cable independently from any movement of said main lever; and said shifting means is provided with an adjusted position immobilization means for immobilizing said shifting means at any adjusted position in an adjusting range along the longitudinal direction of said inner cable.

2. The apparatus according to claim 1, wherein said shifting means is a threaded member shifting mechanism comprising:
   a tubular external thread member connected to the end of said outer tube; and
   an adjusting dial screwed on said external thread member.

3. The apparatus according to claim 1, wherein said shifting means is a lever mechanism comprising:
   an adjusting lever;
   a pivot link fixedly connected to said adjusting lever; and
   a tractive connecting member connectively disposed between said pivot link and the end of said outer tube.

4. The apparatus according to any one of claims 1 to 3, wherein said driven member is a throttle valve of an internal combustion engine.

5. The apparatus according to claim 3, wherein said adjusting lever is capable of being moved independently of said main lever.

6. The apparatus according to claim 3, wherein said adjusting lever is arranged outside said housing.

7. The apparatus according to claim 2, wherein said adjusting dial is capable of being rotated independently of said main lever.

8. The apparatus according to claim 2, wherein at least a portion of said adjusting dial is arranged outside of said housing.

9. An apparatus comprising:
   a driven member; and
   a hand lever device comprising:
      a housing;
      a main lever pivotally attached to said housing; and
      a Bowden cable having an inner cable and an outer tube;
   wherein one end of said inner cable is connected to said main lever and extends through said outer tube for controlling said driven member; and
   said outer tube is provided with a shifting means for forcibly shifting one end of said outer tube along the longitudinal direction of said inner cable independently from any movement of said main lever;
   said shifting means is a lever mechanism comprising:
      an adjusting lever;
      a pivot link fixedly connected to said adjusting lever; and
      a tractive connecting member connectively disposed between said pivot link and the end of said outer tube;
      said adjusting lever is capable of being moved independently of said main lever; and
      a Belleville spring is interposed between said adjusting lever and said housing.

* * * * *